J. J. Sherman.
Evaporator.
No. 3,427. Reissued May 11, 1869.
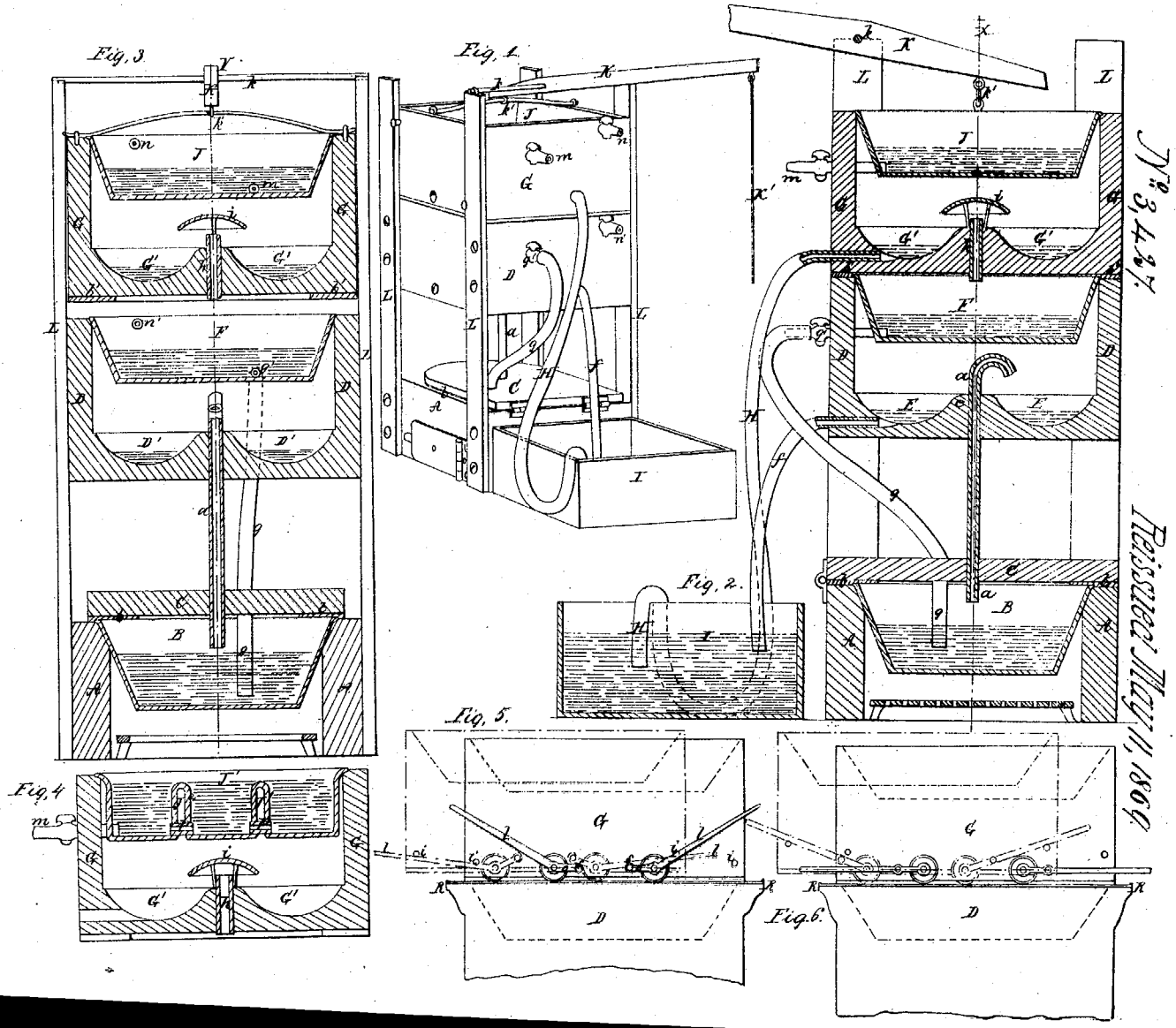
Witnesses
R. T. Campbell
J. N. Campbell
Inventor
J. J. Sherman.
by Munn & Co. Attorneys
N. PETERS, PHOTO-LITHOGRAPHER, WASHINGTON, D. C.

UNITED STATES PATENT OFFICE.

JOSIAH J. SHERMAN, OF ALBANY, NEW YORK.

IMPROVED APPARATUS AND PROCESS FOR EVAPORATING LIQUIDS.

Specification forming part of Letters Patent No. 86,948, dated February 16, 1869; Reissue No. 3,127, dated May 11, 1869.

*To all whom it may concern:*

Be it known that I, JOSIAH J. SHERMAN, of the city of Albany, in the county of Albany and State of New York, have invented a new and Improved Process and Apparatus for Evaporating Liquids; and I do hereby declare that the following is a full, clear, and exact description thereof, reference being had to the drawings accompanying this specification, and making part of the same, in which—

Figure 1, Sheet 1, is a perspective view of one form of apparatus for conducting the improved process. Fig. 2, Sheet 1, is a vertical section taken centrally through the apparatus, and exposing to view its interior construction. Fig. 3, Sheet 1, is a vertical section taken transversely through Fig. 2, in the plane indicated by the red line *x*. Fig. 4, Sheet 1, is a vertical central section through an evaporator having its pan or vat subdivided by hollow partitions. Figs. 5 and 6, Sheet 2, illustrate two modes of removing the supplemental pans horizontally from the position over an antecedent or lower pan or vat.

Similar letters of reference indicate corresponding parts in the several figures.

The object of my invention is to utilize a large proportion or the whole of the latent and sensible heat of the vapor which escapes from vessels during the process of evaporating liquids, by combining with one or more primary evaporating-vessels one or more supplemental evaporating-vessels, in such a manner that the latter shall be exposed to the heat of the vapor generated in the primary vessel or vessels, as will be hereinafter explained.

To enable others skilled in the art to understand my invention, I will describe the best means known to me for carrying it into effect.

In reference to the evaporating pans or vessels which I have represented in the accompanying drawings, I shall denominate the evaporator, which receives heat immediately from the furnace, the "primary vessel," and the others I shall denominate "supplemental vessels."

B represents a primary vessel which is properly set in a furnace, A, from which it receives its heat. This vessel B, as well as the furnace, may be constructed in the usual or any suitable manner, and, if it is desired to increase the evaporative capacity of the apparatus, two or more primary vessels may be employed, arranged side by side, in the same or different fire-chambers. The vessel B is closed on top by a cover, C, which may be hinged or otherwise attached, and between this cover and the upper edge of said vessel or vessels, as the case may be, a packing, *b*, of india-rubber or other suitable material, is applied, which will make a tight joint when the cover is closed and prevent the escape of vapor or steam rising from the liquid in the primary vessel during the process of evaporation. This cover C may be made of wood or of such other substance or combination of substances as will render it a good non-conductor of heat.

Above the primary vessel B, and supported by a suitable frame-work, L, is a steam-tight chest, D, made of a suitable non-conducting material, and having a supplemental vessel, F, fitted in a suitable manner into its upper end, so as to leave a steam-chamber beneath this vessel and the bottom of said chest. The chamber inclosed in part by the bottom and side walls of the chest D and the bottom and side walls of the evaporating-vessel F communicates with the steam above the liquid in the primary vessel B by means of a pipe, *a*, which may be made in part of a flexible substance to allow the cover C to be raised when access is desired to the primary vessel. The upper end of the pipe *a* is curved over within the steam-chest D in the form of a goose-neck for preventing condensed vapor returning into the primary vessel. The steam which rises from the vessel B during evaporation therein will communicate more or less of its heat to the contents of the vessel F, which is thus utilized for additional evaporation therein, and as this steam condenses the water will be received in an annular channel or trough, E, which is formed in the bottom of the chest D, and which surrounds the central elevation, *e*, through which the pipe *a* passes, from which trough the water of condensation may be conducted off through a pipe, *f*, to a tank, I, or to any other suitable receptacle. If the discharge end of water-pipe *f* leads into the tank I and such end is immersed in the water therein, it is obvious that the density of the vapor in the steam-chest and vessel B and its corresponding degree of heat may be indefinitely increased, according to the strength of the apparatus and the degree of restraint allowed by the depth of the tank or the appendages hereinafter explained.

The vessel F is provided with two stop-cocks, $n'$ $g'$, which are inserted steam-tight through one of its sides, and also through one side of the chest D. The cock $n'$, near the top of said vessel F, serves as an induction-passage for the liquid to be evaporated; and the cock $g'$, at or near the bottom of said vessel, serves as an eduction-passage to draw off the liquid by a proper tube or channel, to conduct it wherever desired.

The drawings show a pipe, $g$, leading from the eduction-cock $g'$ to and through the cover C of the primary vessel B, whereby liquid may be conducted from the supplemental vessel F into the primary vessel when it is desired to limit the degree of concentration in the former and complete it in the latter.

For the purpose of further utilizing the heat generated in the primary vessel B, I arrange, on the top of the steam-chest D, so as to cover the supplemental vessel F, another steam-chest, G, having fitted into it an evaporating-vessel, J, which parts may be constructed like the corresponding parts on which they are supported, as shown in the drawings. In this instance I make the bottom of the steam-chest G, together with a packing, $b'$, serve as a steam-tight cover for the vessel F, and establish communication between the steam-space above the liquid in the latter vessel and the steam-space in the chest G by means of a vertical pipe, $h$, or a larger opening than is afforded by this pipe, which has arranged above it a shed, $i$. This shed is so shaped as to conduct the water of condensation away from pipe or opening $h$ and cause it to drip into an annular trough, G', which corresponds to the trough E in the steam-chest D, as shown in Figs. 2 and 3. By this arrangement the cover C and steam-pipe $a$ described in reference to the primary vessel B are rendered unnecessary, and the loss of heat incident to such exposed parts is obviated. In this modification it is necessary to provide for occasional lifting or removing the steam-chest G from its working position to allow convenient access to the vessel J. For this purpose I may use a lever, K, having its fulcrum at $k$, and connected by a link and bail or other suitable means to the chest G, which chest is allowed a vertical movement, and is guided by the uprights of the frame L and studs or cleats applied to its sides. A rope attached to the longest arm of said lever may be used for drawing down this arm and elevating the chest and its vessel; or blocks and tackle may be used for this purpose instead of a simple rope. A pipe may be applied to the eduction-cock $m$ of the vessel J, and caused to conduct its concentrated contents into either one of the vessels F B, or wherever may be desired. In this modification of steam-chest and its evaporating-vessel I have also shown a mode of increasing automatically the restraint desired to be imposed upon the escape of the water of condensation from the steam-chamber in chest G, and thus also increasing the density and corresponding heat of the steam contained therein, supposing it to be generated in greater quantities than will be absorbed by the bottom of vessel J, at or slightly above atmospheric pressure. To this end I employ a waste-pipe, H, leading from the chamber in the steam-chest G into the tank I. This pipe may be made of any desired length, and it is carried down outside of the tank I and its nozzle passed over the side of this tank and immersed in the water therein substantially as shown in Figs. 1 and 2. Its operation will be as follows: The water of condensation accumulating in the steam-chest having no exit but through the tube H, soon fills it to a height corresponding to that of the tank. Hence, supposing the tank to be filled the water of condensation cannot pass from the steam-chamber until it shall overcome, in addition to the atmospheric pressure, the weight of the column of water contained in the tank side of the pendent portion of said pipe and this confinement of the water of condensation confines and intensifies the steam also but such increase of pressure in a steam-chest will not, in all cases, be desirable.

Where circumstances will admit of a suitable degree of horizontal enlargement of the supplemental evaporating-vessels and their steam chests beyond the size of the primary vessel or vessels, their comparative size may be so increased that their condensing or heat-absorbing surfaces will be more than equal to the absorption of all the heat transmissible from or to the other, and in such cases it is obvious that one enlarged supplemental vessel may suffice not only for one but for several primary vessels, and the process and apparatus described be simplified accordingly. Where this horizontal enlargement is not admissible, two, three, or more supplemental vessels may be used in their due relative positions, either directly or by means of the proper communicating pipes obliquely above or away from their primary or antecedent vessels or one another, and will operate with more or less of the supplemental gains due to their use, according to the completeness of their construction and arrangement.

It is obvious that the arrangement of the vessel J and its steam-chest and adjustment to the vessel F, as above described, are also applicable to the vessel B, and vice versa, and so to any subsequent ones. Although the form of the supplemental vessels above described will in many cases, be preferable on account of the large under surface exposed to the action of the heat within given horizontal limits, it is not indispensable that the bottoms of the vessels be anything more in this respect than simple metallic diaphragms, so placed and adjusted as to form flat steam-tight roofs to the chambers of the steam-chests.

Where it is desirable to place a supplemental vessel directly upon a primary or another su plemental vessel, a vertical stop-cock passed steam-tight through both roof and shed of the steam-chest may be substituted for the eduction-pipe *g* when it is desired to pass the contents of the superimposed vessel into the vessel below it.

The supplemental vessels may be so constructed as to expose a very large amount of surface to the action of the heat in their steam-chests within a given horizontal area. This may be done by corrugating the bottoms of the vessels, or by forming arched or hollow partitions $J^2$, as shown in Fig. 4, which rise from the bottom of the vessel J a suitable height and separate this vessel into several apartments, which latter communicate with each other through short horizontal pipes *p* passing transversely through said partitions.

There may be several modes of removing the supplemental vessels with their steam-chests sufficiently aside from their primary or antecedent vessels to allow convenient access to them without injury to the packing interposed to make steam-tight joints, as would be required when one is placed immediately upon the top of the other.

I have above described several modes of practically carrying out my invention; but I do not confine myself to the precise means herein shown, as other means equivalent thereto and operating upon the same principle may be employed.

Having described my invention, what I claim as new, and desire to secure by Letters Patent, is—

The condensing apparatus consisting of one or more supplemental chests, with their steam-chambers and evaporating-vats, when constructed and adjusted with relation to one another and in relation to one or more primary evaporators so as to take up and utilize for purposes of further condensation, by succeeding processes of evaporation, heat generated in the latter, before it is allowed either to pass them or escape into the atmosphere, or otherwise, all substantially as described.

JOSIAH J. SHERMAN.

Witnesses:

CHARLES M. JENKINS,
PAUL F. COOPER.